United States Patent [19]
Detwiler et al.

[11] Patent Number: 5,825,814
[45] Date of Patent: Oct. 20, 1998

[54] HIGH SPEED, HIGH AND MEDIUM FREQUENCY COMMUNICATION SYSTEM

[75] Inventors: Peter Mead Detwiler, Gladstone, N.J.; Andrew Burton White, Thomasboro, Ill.; Kelly James Hulse, Fort Lauderdale, Fla.

[73] Assignee: PinOak Digital Corporation, Gladstone, N.J.

[21] Appl. No.: 639,856

[22] Filed: Apr. 19, 1996

[51] Int. Cl.$^6$ .............................. H04B 1/38; H04B 7/00; H04Q 7/00; H01Q 3/24
[52] U.S. Cl. .......................... 375/219; 375/220; 375/222; 370/310; 455/524; 455/32.1; 343/876
[58] Field of Search .................... 375/219, 220, 375/222; 370/310; 455/524, 32.1, 427, 428, 12.1, 557; 343/876, 879, 750

[56] References Cited

U.S. PATENT DOCUMENTS

| Re. 34,796 | 11/1994 | Smith et al. | 343/876 |
|---|---|---|---|
| 3,098,231 | 7/1963 | St. Vrain et al. | |
| 3,518,695 | 6/1970 | Schroeder. | |
| 4,213,132 | 7/1980 | Davidson | 342/350 |
| 4,349,825 | 9/1982 | Shmitka | 343/750 |
| 4,491,966 | 1/1985 | Morcerf et al. | 455/32.1 |
| 4,639,937 | 1/1987 | McRae et al. | 375/267 |
| 4,694,467 | 9/1987 | Mui | 375/200 |
| 5,020,077 | 5/1991 | Rhodes | 375/222 |
| 5,030,948 | 7/1991 | Rush | 340/825.44 |
| 5,081,468 | 1/1992 | Williams | 343/895 |
| 5,097,485 | 3/1992 | O'Connor et al. | 375/283 |
| 5,138,327 | 8/1992 | Chang et al. | 342/367 |
| 5,253,270 | 10/1993 | Petit | 375/270 |
| 5,301,359 | 4/1994 | Van den Heuvel et al. | 455/524 |
| 5,379,215 | 1/1995 | Kruhoeffer et al. | 364/420 |
| 5,410,754 | 4/1995 | Klotzbach et al. | 370/310 |
| 5,426,427 | 6/1995 | Chinnock et al. | 340/827 |
| 5,426,513 | 6/1995 | Scorse et al. | 358/433 |
| 5,471,473 | 11/1995 | Tejima et al. | 370/431 |
| 5,565,863 | 10/1996 | Simon et al. | |

OTHER PUBLICATIONS

P.M. Detwiler, "Pactor Station Design Concepts", RTTY Jounal Jul./Aug. 1992, pp. 12–14.
P.M. Detwiler, "A Conversation With WA2MFY", RTTY Journal, Sept. 1993, p. 17.
P.M. Detwiler, "Super Station—WA2MFY", RTTY Journal, Oct. 1993, p. 19.

(List continued on next page.)

Primary Examiner—Chi H. Pham
Assistant Examiner—Khai Tran
Attorney, Agent, or Firm—Kenyon & Kenyon

[57] ABSTRACT

A high frequency, high speed data communication system for providing electronic mail, file transferring, Internet access, weather forecasts and other database and communication options to remote HF/MF users, such as vessels at sea. A conventional, multi-featured, land-line bulletin board system is employed at a central communication facility for the provision of data communication services. A remote computer accesses an HF/MF link at the central communication facility via an HF/MF modem coupled to an HF/MF radio and antenna. The HF/MF link includes an antenna, HF/MF radio, HF/MF modem, and an interface computer for performing protocol and interface conversion between the land-line BBS and the HF/MF modem. Multi-user capability is provided through the simultaneous employment of multiple HF/MF links at the central communication facility. Multi-frequency operation of each HF/MF link is provided through the scanning of each HF/MF radio in conjunction with an antenna tuning system. The antenna tuning system provides virtually instantaneous tuning of an antenna among a predetermined set of frequencies through the switching in of one of a set of pre-tuned manual antenna tuners. A centralized scanning computer facilitates multi-frequency operation through the dynamic reallocation of assigned frequencies among the various HF/MF links so that any links which are not busy servicing users can be employed to scan available frequencies.

25 Claims, 10 Drawing Sheets

OTHER PUBLICATIONS

P.M. Detwiler, "Weather Reporting: From Marconi to Clover On High Frequency", Marine Electronics, May/Jun. 1994.

P.M. Detwiler, Presentation to the Radio Technical Commission For Maritime Services, May 10, 1994.

D. Strickland, "Alternatives To Cellular Phones In The Bahamas", Southern Boating Magazine, May 1995.

T. Queeney, "Marine Technology Notes, HF Radio Renaissance", Ocean Navigator Magazine, Jul./Aug. 1995.

Comments of Pin Oak International, Inc. In the Matter of Amendment of the Commission's Rules Concerning Maritime Communications, May 29, 1993.

Application of Pin Oak International Inc. for Land Radio Station License In The Maritime Services, Jul. 27, 1993.

Application of Pin Oak International Inc, for Land Radio Station License In The Maritime Services, Mar. 18, 1994.

Application of Pin Oak International, Inc. for a Developmental License from the Federal Communications Commission, Aug. 3, 1993.

HIGH SPEED, HIGH AND MEDIUM FREQUENCY COMMUNICATION SYSTEM

FIELD OF THE INVENTION

The present invention relates generally to a high frequency (HF) and medium frequency (MF) communication system, and more particularly to a communication system for the transmission of digital information over a high speed, high and medium frequency communication network.

BACKGROUND INFORMATION

HF and MF communication is well-known in the marine, land and air environments and utilizes the electrical properties of the atmosphere for the propagation of radio signals. In particular, HF/MF communication frequently "bounces" radio signals off the ionosphere and thus achieves longer-range communication than is available with other terrestrially-based communication means, such as, e.g., microwave links or cellular communications, which are limited by the curvature of the earth or by low and medium frequency ground waves.

For small vessels at sea, HF/MF communication provides the most cost-effective, and often the most feasible, data communication option. Satellite (i.e., celestially-based) communication involves substantial capital equipment investment, and the air time fees charged by service providers are often extremely expensive, costing several dollars per minute. Furthermore, the equipment necessary for communicating via satellite is bulky and thus impractical for installation on small vessels. In addition, small vessels are more easily tossed about in rough seas than are larger vessels, which are largely weather immune except for hurricane or strong gale conditions. Small vessels are thus, for example, more likely to have their satellite communication interrupted by an inability to maintain gimbaled "lock" on a satellite signal, or by spray or heavy rain absorbing the satellite signal. HF/MF communication has been, until recently, relatively slow, with data rates using conventional modulation techniques, such as SITOR, only on the order of approximately 50 baud for partially error-corrected data. However, the recent development of high speed HF/MF modulation techniques, such as Clover, Clover 2000, PACTOR, and G-Tor, has increased HF/MF communication speeds to as much as 600 baud without data compression, and 6000 baud and higher with compression within a wideband channel. These new high speed HF/MF modulation techniques also provide very high error-correcting capabilities as compared with conventional HF/MF modulation techniques, and often require less bandwidth than a frequency shift keyed (FSK) signal at the same date rate and provide spectrally purer signals.

Because of the slow data rates and poor error-correction capabilities associated with conventional HF/MF modulation techniques, HF/MF radio communication has heretofore required the employment of high power transmitters, on the order of 5 to 30 kilowatts, in order to generate a recoverable signal at remote receiving sites. This high power requirement has resulted in HF/MF radio systems which are very expensive in terms of capital equipment, real estate, and operating costs.

In addition, high power communication typically requires a large physical separation, on the order of a kilometer or more, of the transmit and receive antennae for a particular high frequency channel, due to the spurious emissions often produced by the transmitter which interfere with the receiving function. Indeed, some commercial HF/MF stations separate their transmitters and receivers by many tens of kilometers. In addition, some commercial HF/MF stations operate in duplex mode, employing separate transmit and receive frequencies, thereby doubling the amount of bandwidth required for single-channel operation.

Furthermore, in a conventional multi-channel (i.e., multi-frequency) HF/MF communication system, the high power requirement mandates that the antennae for each of the communication channels/frequencies be separated by a large distance in order to prevent interference between the various transmitting and receiving antennae. A large separation of the antennae is further necessary in order to prevent receiver front end overload, which can be caused by the high noise levels associated with high power, multi-antenna communication and which reduces receiver sensitivity. Thus, real estate requirements in high power multi-frequency systems are substantial.

A further disadvantage of high power communication systems is the difficulty in such systems of performing the antenna tuning which is often necessary for multifrequency use of an antenna/transceiver pair. In the course of tuning an antenna, extraneous exciter energy is often dissipated through the antenna assembly, transmission line, and antenna tuning equipment. Antenna tuners and tuning equipment capable of withstanding the high extraneous energy levels associated with the tuning of conventional, long-range HF/MF communication system are quite expensive. Thus, antenna tuning is expensive to implement in high power HF/MF systems. While there is capability for multifrequency operation in the absence of antenna tuning through the use of broadband or multifrequency antennae, this capability is limited, as the frequencies to which such antennae can be tuned are limited to those within the specified band of a broadband antenna, or within the limited frequency set of a multifrequency antenna. More comprehensive multifrequency operation using a single antenna requires an antenna tuning capability.

The use of antennae which are dedicated to a single frequency or to a very limited set of frequencies is not cost-effective in HF/MF communication systems because certain frequencies may be idle or unused for long periods of time due to changing HF/MF transmission conditions. For example, propagation conditions are transitory, with some propagation characteristics changing over a course of years, seasons, months, and days and even during a particular day such that particular HF/MF frequencies will not be as reliably transmissible as others at a given time. Thus, some frequency-dedicated antennae and related transmitters may not be utilized for many months.

As with their land-based counterparts, persons traveling on vessels at sea need the capability to network with other individuals, both land- and sea-based, for the purposes of, for example, transferring and receiving electronic data files, obtaining weather, safety and other information, and sending and receiving electronic mail.

Electronic bulletin board systems (BBSs), which provide dial-up user services such as electronic mail, database, Internet access and file transferring capabilities, are well known. However, most conventional BBSs are designed for "land-line" users—i.e., for users who communicate with the BBS over, e.g., the public switched telephone network (PSTN) via, for example, a Hayes-compatible modem. While BBSs with HF/MF connectivity are known, available HF/MF BBSs have a number of limitations. For example, available HF/MF BBSs are generally only single frequency, and thus "single user" (i.e., they allow only one remote user to connect at a time), because of the difficulties that have only recently been overcome in employing multiple HF/MF antennae in close proximity. Furthermore, known HF/MF BBSs have severely limited functionality as compared with land-line BBSs due to the traditionally slow HF/MF data rates. Thus, available HF/MF BBSs cannot be used at the core of a robust, multi-user, multi-featured HF/MF communication system.

further essential for vessels at sea is access to low-cost, offshore weather forecast information. Small vessels, which are less weather-immune than larger merchant vessels, need detailed, route-specific weather information in order to travel safely. Although this data is available from private weather forecasting services, these services are often prohibitively expensive due to the high transmission costs of satellite services and slow HF/MF common carriers.

The present invention is directed to providing reliable, low cost, high speed HF/MF communication for remote users, such as vessels at sea. The present invention provides remote users with file transferring and electronic mail capabilities, up-to-the-minute weather information on demand, Internet access, and other electronic data capabilities.

SUMMARY OF THE INVENTION

The present invention relates to a high speed, HF/MF communication system for providing remote users with low-cost data communication capabilities, such as electronic mail, file transfer, and other bulletin board services. The present invention utilizes the low power operation enabled by recently-developed high speed narrowband and wideband HF/MF modulation techniques, such as Clover, Clover 2000 and Pactor II, to provide a central communication facility in which multiple HF/MF links for servicing remote users are located in close proximity. Each of the closely situated HF/MF transmission links has the ability to scan for and service users on multiple, predetermined HF/MF frequencies. The relatively low equipment, real estate, and operating costs associated with this multi-frequency, multi-user, low power communication system result in an economical data communication solution for remote HF/MF users.

The present invention employs a conventional telephone-line bulletin board system for the provision of electronic data services. One feature of the present invention is an interface for transparent data communication between the bulletin board, whose ports are designed for telephone-line dial-up, and the HF/MF links, which provide connectivity for remote HF/MF users.

Another feature of the communication system according to the present invention is the provision of detailed weather data on user demand at the central communication facility for retrieval by remote HF/MF users. The provision of accurate weather forecasting information is especially beneficial to remote HF/MF users on small vessels at sea.

A further feature of the communication system according to the present invention is an antenna tuning capability which provides virtually instantaneous antenna tuning, at the power levels of the central communication facility, to facilitate the multifrequency scanning capability of each of the HF/MF links employed by the present invention's central communication facility.

Yet another feature of the communication system according to the present invention is a central, computerized frequency scanning controller. This computerized scan controller allows for the dynamic reallocation of the preset scan frequencies among the various HF/MF links of the central communication facility, so that any links which are not busy servicing users can be used to scan all available frequencies, thereby optimizing the availability of all frequency channels.

An additional feature of the communication system according to the present invention is an intelligent scanning system, in which multiple directional antennae are employed along with one or more scanning transceivers, so that an incoming call from a remote user can be assigned to the directional antenna which provides the best transmission path for that particular call.

Further features and advantages of the present invention will become apparent from the detailed description which follows.

DETAILED DESCRIPTION OF THE INVENTION

Figure 1:
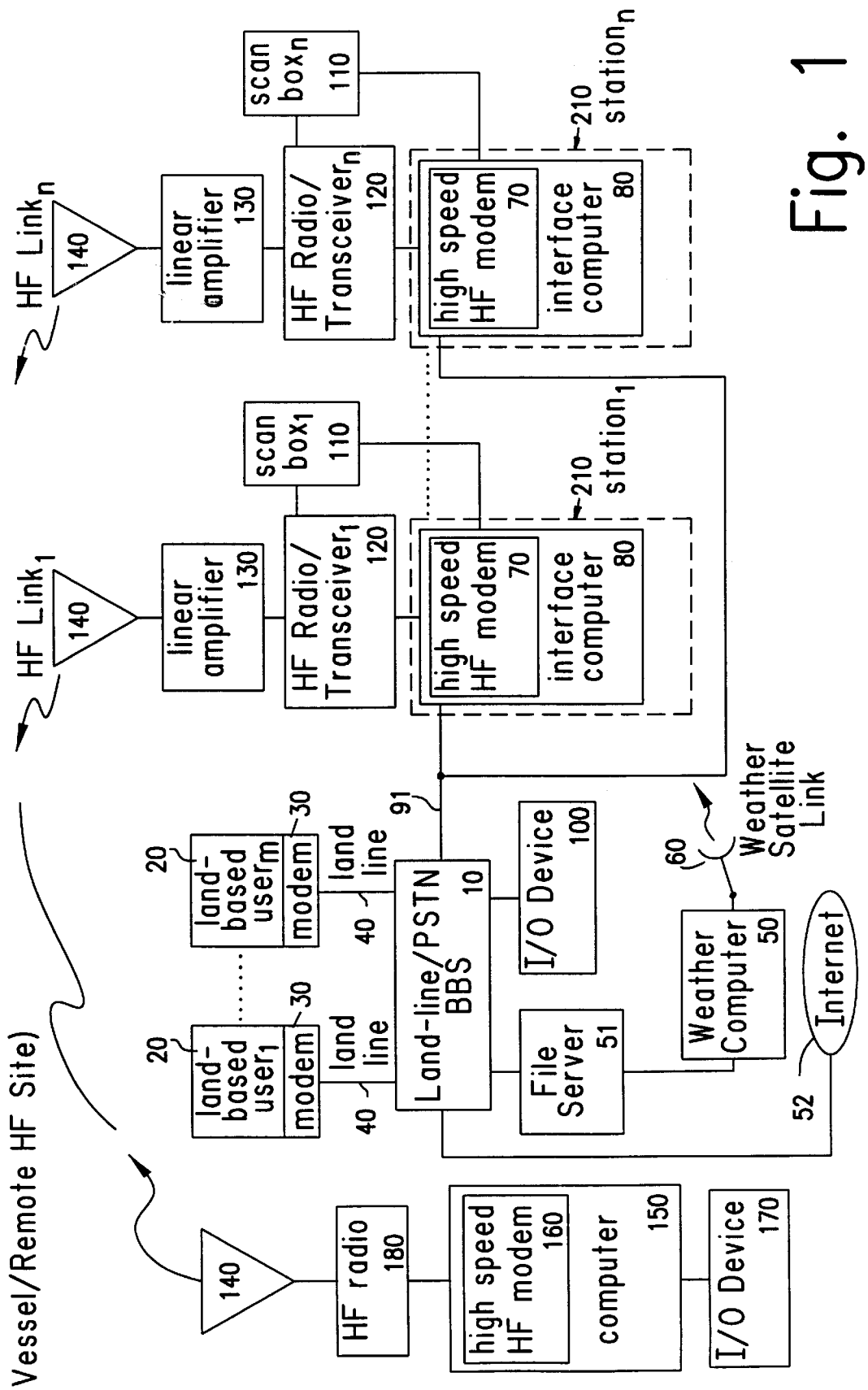
FIG. 1 depicts a single-BBS, multi-user high speed HF/MF communication system according to the present invention with both land- and vessel-based remote users.

While this disclosure refers to HF/MF communication in the marine environment, i.e., where the "remote" users of the land-based central HF/MF communication facility are vessels at sea, the present invention is not limited to the marine environment. Rather, the present invention is applicable to all potential HF/MF communication users, wherever located.

Because of their relatively narrow bandwidth requirements and high error-correcting capabilities, recently-developed high speed HF/MF modulation techniques allow for the transmission of digital data at greatly reduced power levels as compared with conventional HF/MF modulation techniques. This is possible because a lower signal-to-noise ratio can be tolerated when the capability to correct for transmission errors is high, and the narrower signal bandwidth allows for narrower filtering on the receiving end, which screens out more noise.

As an example of the power requirement differential between conventional and high speed HF/MF modulation techniques, only 150 watts is needed in order to transmit data a distance of 5 to 20 thousand kilometers or more using, for example, the Clover or PACTOR II modulation techniques, while 1 to 5 kilowatts often would be required to transmit the same distance using, for example, the well-known SITOR modulation technique. This ability to transmit accurately at lower power results from "code gain," as opposed to gain produced by hardware which is well known in the art.

The present invention employs high speed HF/MF modulation techniques in an economical, low power, multi-user, multi-frequency communication system. The low operating power levels enabled by the recently-developed high speed HF/MF modulation techniques allow for economical multi-user operation. Because of the low spurious emission levels associated with low power operation, multiple antennae can be simultaneously employed in close proximity to one another in one central communication facility, allowing for the servicing of multiple users at a time. Furthermore, lower power operation enables the tuning of a single antenna for operation on multiple frequencies.

Because it utilizes multiple antennae, with each antenna having the ability to tune to, and thus scan, multiple frequencies, the HF/MF communication system according to the present invention is capable of multi-user and multi-frequency operation. By scanning for users on multiple frequencies, the system provides greater utilization of each radio/antenna pair than would be possible if frequency-dedicated antennae were used. Dedicating a radio and antenna to one specified frequency can be particularly wasteful in the HF/MF environment because a given HF/MF frequency may not be suitable for transmission for many months due to poor channel propagation characteristics.

The ability to service multiple users simultaneously with closely situated antennae, the ability to scan for callers on multiple frequencies with each antenna, and the relatively low-cost operating equipment enabled by low power operation are combined in the present invention which provides a lower cost communication option, with a wider range of services, than has heretofore been available to remote users without access to telephone line communication.

FIG. 1 depicts a communication system according to the present invention employing a commercially-available land-line bulletin board system (BBS) 10 for the provision of, for example, E-mail, file transfer, Internet access, and weather and other database services. The BBS 10 has ports capable of supporting several simultaneous users on various HF/MF frequencies. An input/output device 100 is connected to the BBS 10 in order to allow access to the BBS 10, and to remote users via the BBS 10, by individuals at the central communication facility. Access to, for example, the Internet 52 is provided to remote users via the BBS 10.

Figure 1A:
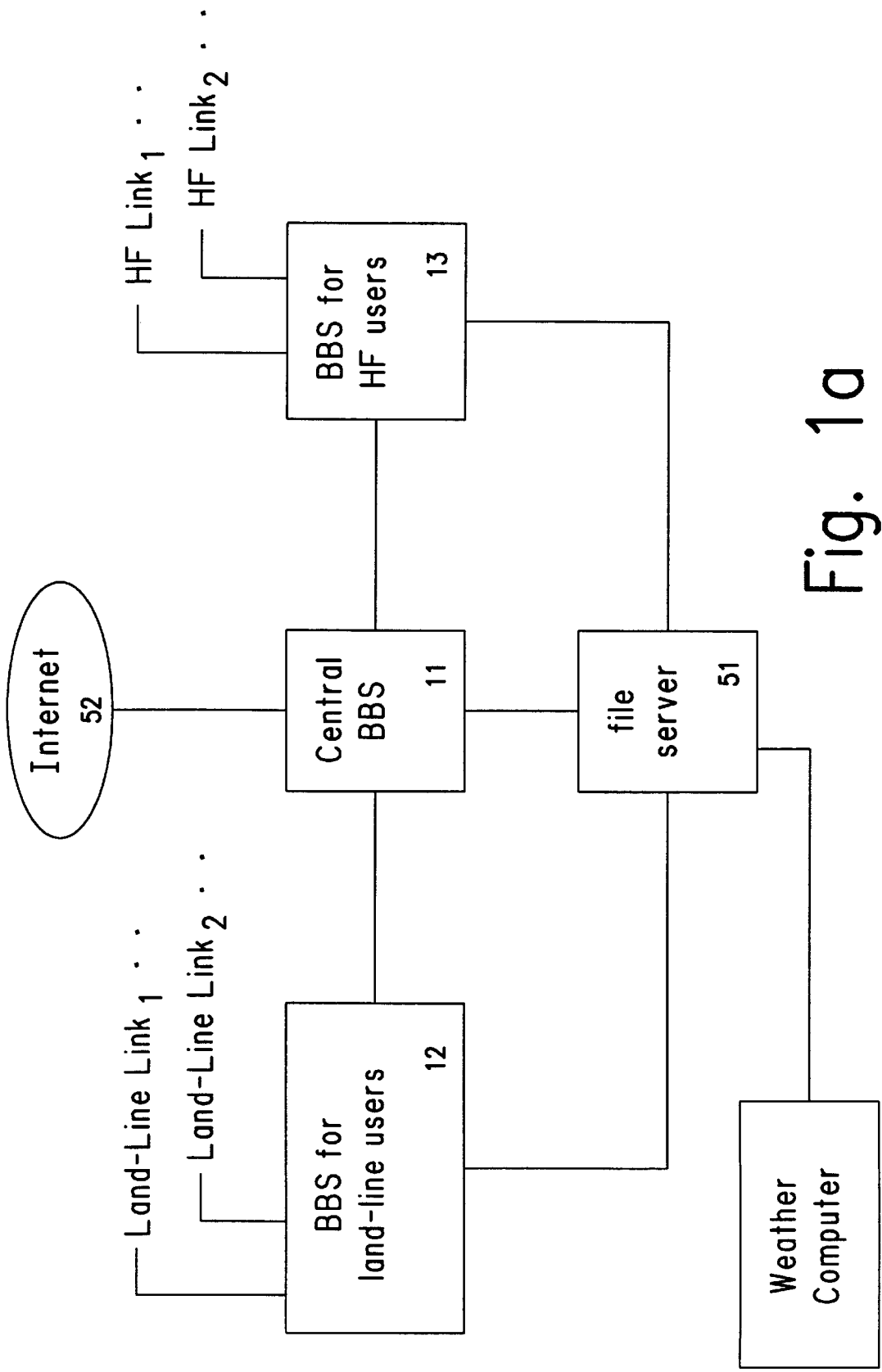
FIG. 1a depicts a multi-user high speed HF/MF communication system according to the present invention employing three BBSs.

In an exemplary embodiment of the present invention, depicted in FIG. 1a, three BBS systems 11, 12 and 13 are employed to perform the BBS services of the single BBS 10 depicted in FIG. 1. Because of the faster data rates available for users connecting via standard telephone lines versus those for users connecting via HF/MF, greater functionality, e.g., color graphics and more complex menus, can be offered to telephone dial-up users. One means of providing this additional functionality is to employ separate, differently configured BBSs for HF/MF users and telephone dial-up users. Referring to FIG. 1a, one BBS 12 is employed for land-line users, while a second, differently-configured BBS 13 is employed for users connecting via HF/MF link. A third, central BBS 11 is employed to provide Internet access and a common message base for E-mail coordination between the land-line user BBS 12 and the HF/MF user BBS 13.

In the above-mentioned exemplary embodiment of the present invention employing three BBSs 11–13, two differently configured ESoft TBBS systems are employed as the land-line BBS 12 and the HF/MF user BBS 13, and an S&H Computer Systems, Inc. TSX BBS is employed as the central BBS 11 to coordinate E-mail and other services between the two TBBS systems. This three BBS configuration functions as, and appears to remote users as, a single BBS 10 such as that shown in FIG. 1.

In order to prevent the BBS 13 from, e.g., timing out on remote HF/MF users whose data rates lead to relatively slow response times, the inactivity timer parameter of the BBS 13 is configured in an exemplary embodiment so as to be longer than would be necessary for communication with telephone dial-up users. The ESoft TBBS employed as the HF/MF user BBS 13 in an exemplary embodiment of the present invention provides, in addition to basic configurability options, a programming language capability. This programming language allows for applications to be written which then run within the BBS itself.

In an exemplary embodiment, an application written for the ESoft TBBS using this programming language runs within the BBS 13. This application minimizes the communication delays that would otherwise be present due to the slow HF/MF data rates and the data-intensive nature of a full-featured, interactive land-line BBS. For example, the application is written so as to reduce the interactive nature of the BBS-user interface. Accordingly, the usual echoing back by the BBS of each character entered via the input-output device 170 by the remote HF/MF user is eliminated. In addition, a number of options, menus and screens which would ordinarily be presented to dial-up users of the BBS 13 are disabled so as to minimize communication delays. If, in another embodiment of the present invention, a BBS 13 not having a programming language capability is employed, or if a single BBS 10 is used for HF/MF and land-line users and it is not desired to reduce the functionality within the BBS itself, communication delay minimization such as is currently being performed in an exemplary embodiment within the BBS 13 itself could instead be performed by analogous processing within the interface computer 80.

In an exemplary embodiment of the present invention shown in FIG. 1, weather information is received from, for example, the National Weather Service satellite via a weather satellite link 60. The received stream of weather information is processed by a computer 50 which sorts the incoming stream of weather information, parses the information into regional forecast files, removes any extraneous characters in the files, and stores the files in a central storage location.

The weather files are stored, for example, on a file server 51 for retrieval by the BBS 10. The processed weather information is then retrieved as needed by the BBS 10 for viewing by or downloading to remote users of the communication system. It is not a requirement of the present invention that a file server 51 be used for data storage;

weather and other data could be stored directly on the BBS 10. However, a file server 51 provides additional storage space and a central file back-up location. Access to additional data services, such as news and financial information, can be similarly provided to remote users via the BBS 10, either directly or via a file server 51.

The communication system depicted in FIG. 1 provides access to remote users via both HF/MF and land-line connections. One or more users with access to a land-line 40, such as, e.g., a Public Switched Telephone Network (PSTN) line, an Integrated Services Digital Network (ISDN) line, or a leased line can access the BBS 10 with a land-based computer 20, having an input-output (I/O) device 100 such as a keyboard and monitor, via an interface device such as, e.g., a modem 30. For remote connection via a PSTN line, the modem 30 is, e.g., a Hayes-compatible modem.

Remote users can also easily access the communication system by means of an HF/MF radio link. One or more remote users having a computer 150 and input-output device 170 can access the communication system using a high speed, HF/MF modem 160, a conventional FCC marine-type certified HF/MF single sideband (SSB) transceiver 180 having, for example, at least 100 watts output capability, and a conventional HF/MF antenna 190. On smaller vessels, for example, an omnidirectional whip is used as the antenna 190 due to vigorous vessel motion. In an exemplary embodiment of the present invention, HF/MF modulation is achieved using a HAL Communications Corp. PCI4000 Clover II modem board. In another exemplary embodiment, a PTC-II Pactor modem is used. However, any HF/MF modem employing a high speed modulation technique, i.e., a modulation technique capable of symbol rates in excess of, e.g., 100 baud, can be used in practicing the present invention. Depending upon the modulation technique employed by the HF/MF modem, of course, it is possible to have data rates that greatly exceed the symbol rates.

The land-based central communication facility of the present invention includes one or more stations 210, each of which is capable of servicing a single remote HF/MF user at a time. Thus, the number of simultaneous users that can be serviced is equal to the number of stations 210 in the central communication facility. Each station 210 includes an interface computer 80 and a high speed HF/MF modem 70, with the modem 70 being either external to or installed in the interface computer 80. The stations 210 can employ different HF/MF modem 70 types, such as, for example, PACTOR or Clover modems, in order to service remote users having differing types of modems 160. As another alternative, each station 210 can be configured to include two or more different HF/MF modems 70 so that a given station 210 can communicate with remote users having various types of modems 160.

Each computer 80 of each station 210 in the central communication facility of the present invention is connected to the BBS 10 by a communication line 91. The communication line 91 can be, for example, a hardware cable (such as an RS232 communication cable) or a local area network (LAN) connection. For implementations of the present invention wherein the BBS 10 and the computers 80 supporting the HF/MF modems 70 are physically separated by more than, for example, 15–20 feet, a LAN implementation of the communication line 91 is preferable to a hardware cable implementation because LAN connections are more reliable than hardware connections at long distances. For very long distances between the BBS 10 and the computers 80, the communication line 91 can be, for example, a telephone line/modem combination or a leased digital line.

The interface computer 80 according to the present invention provides connectivity between the high speed HF/MF modem 70 and the land-line BBS 10. The interface computer 80 performs the necessary interface and protocol conversion to allow a unique HF/MF modem board to connect to a standard land-line BBS 10 modem port. The interface computer 80 thus sets up a transparent link between the high speed HF/MF modem 70 and the BBS 10 so that data can be transferred bidirectionally between them.

The interface conversion performed by the interface computer 80 is dependent upon the particular HF/MF modem 70 being used and the type of communication ports employed by the BBS 10. For example, in a preferred embodiment of the present invention employing an ESoft TBBS having serial communication ports and a HAL Communications Corp. PCI4000 Clover II modem card installed in the interface computer 80, the interface computer 80 converts the parallel industry standard architecture ("ISA") interface of the PCI4000 into a serial modem type interface compatible with the land-line BBS 10. In an embodiment of the present invention employing an external PTC-II Pactor modem having a serial communication port, for example, two communication ("COM") ports of the interface computer 80 are used to implement the bridge connection: one COM port to connect to the BBS 10 modem port and a second COM port to connect to the PTC-II serial port. In an embodiment of the present invention employing a HAL Communications Corp. DSP4100 Clover 2000 modem card installed in the interface computer 80, for example, the same interface conversion is performed as when a PCI4000 modem card is used. In an embodiment of the present invention employing a HAL Communications Corp. DSP4100 serial external Clover 2000 modem, for example, the interface conversion is the same as for a PTC-II Pactor modem.

Land-line BBSs 10 are available with various connectivity types, including, for example, serial RS232 interfaces, Ethernet interfaces, and TCP/IP interfaces. When the interface computer 80 is connected via a COM port to a serial port of a BBS computer 10 using an RS232 cable as the communication line 91, a hardware null modem adapter is included between the interface computer 80 and the BBS 10. This hardware adapter converts the computer's serial COM port from a Data Terminal Equipment (DTE) interface into the Data Communication Equipment (DCE) interface that the BBS program expects. If, however, the interface computer 80 and the BBS computer 10 are separated by a very large distance, a regular modem can be employed in lieu of the null modem.

Figure 6:
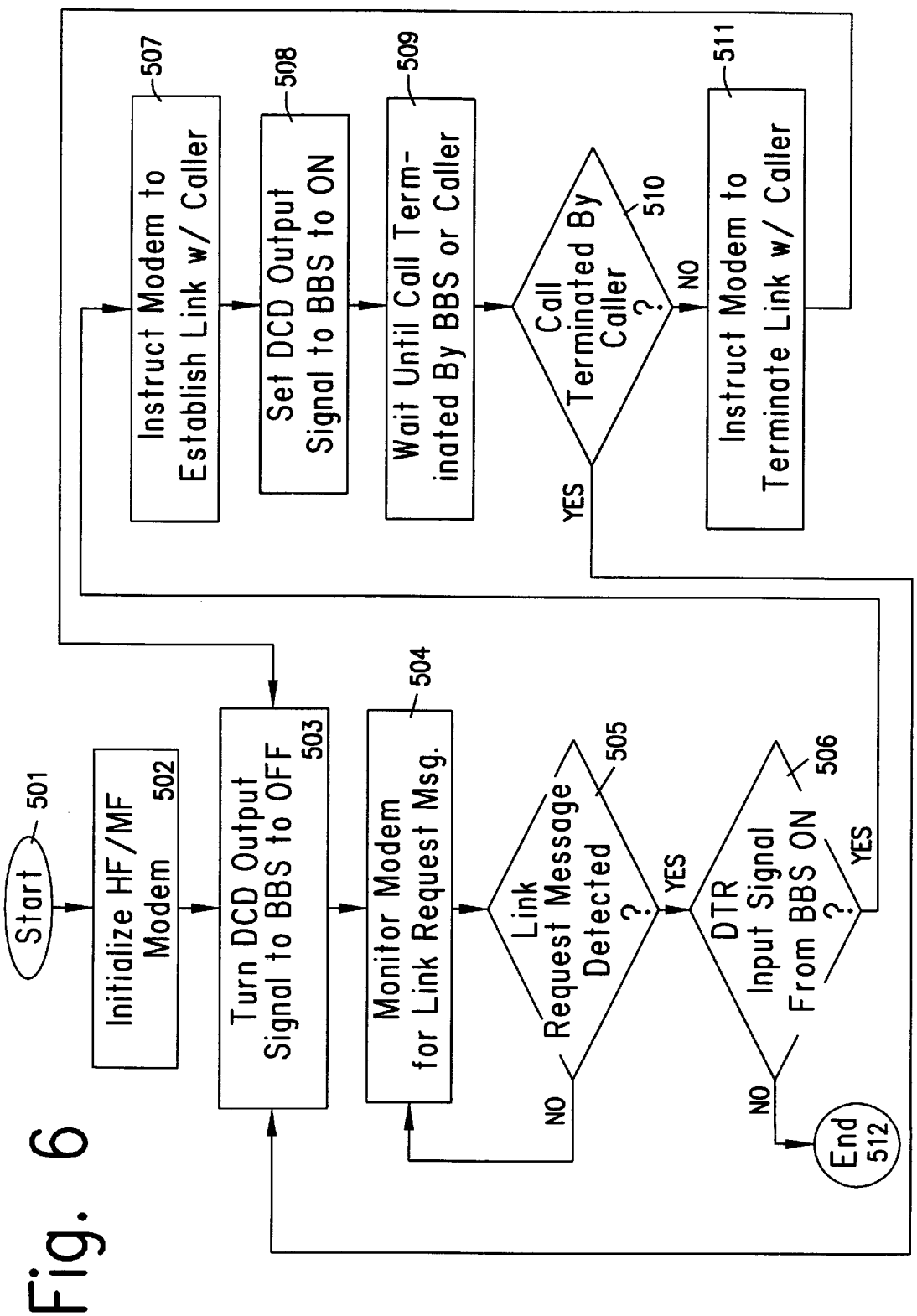
FIG. 6 depicts an interface and protocol conversion functionality implemented by an interface computer according to the present invention.

In addition to performing interface conversion, the interface computer 80 performs the protocol conversion necessary for transparent data communication between the land-line BBS 10 and the HF/MF modem 70. The methodology employed by the interface computer 80 in performing protocol conversion is depicted in FIG. 6 and is discussed in greater detail below.

Each station 210 of the central communication facility of the present invention as depicted in FIG. 1 has associated with it, for example, an HF/MF radio/transceiver 120, a linear amplifier 130, an HF/MF antenna 140, and a scan box 110. In an exemplary embodiment of the present invention, a conventional scanning HF/MF radio, such as an ICOM 765, with spectrally clear upper sideband (USB) or lower sideband (LSB), and a conventional scanning linear amplifier, such as an ICOM 4KL, are employed. The HF/MF antenna 140 can include, for example, a conventional log periodic, dipole, straight vertical, or cage antenna.

The scan box 110 associated with each station 210 provides electromechanical scanning of the HF/MF transceiver 120, among a predetermined set of HF/MF frequencies, for incoming callers. The scan box 110 is a hardware device which employs relays to trigger the built-in up/down stepping inputs of the HF/MF transceiver 120, thereby causing the transceiver 120 to scan through a list of frequencies previously stored in the transceiver's programmable frequency memory locations.

For example, when the HF/MF modem 70 detects an incoming call on a particular frequency, it pulls to ground an output signal connected to the HF/MF radio's push-to-talk ("PTT") signal and to the scan box 110, thereby indicating the start of a radio connection. The scan box 110 connected to the HF/MF radio 120 ceases the scanning of the HF/MF radio 120 while the PTT signal is keyed. Some HF/MF modems have built-in scan lines which electrically change state when an incoming call is detected and which can be used, in lieu of the PTT signal, to trigger the cessation of scanning by the scan box 110. When the HF/MF modem 70 discontinues grounding the PTT signal, the scan box 110 pauses momentarily to allow the HF/MF modem 70 to determine whether another call is coming in on the same frequency and, if so, to key the PTT signal again. If the PTT signal is not activated during the pause, the scan box 110 resumes the scanning of the HF/MF radio 120.

FIG. 6 depicts the methodology employed by the interface computer 80 in performing the protocol conversion necessary for transparent data communication between a conventional, land-line BBS 10 having standard serial interface connections and a unique HF/MF modem 70. In a configuration of the present invention in which a BBS 10 having alternative connectivity types, such as Ethernet or TCP/IP, is used, the protocol conversion depicted in FIG. 6 and discussed below could readily be altered to fit the particular interface type.

Referring to FIG. 6, following startup in step 501, the interface computer 80 proceeds to step 502 wherein it initializes the HF/MF modem 70. Initialization includes, for example, starting the HF/MF modem's operating system and loading configuration parameters onto the modem board 70. For certain HF/MF modems 70, such as the PCI4000, initialization also includes the loading of necessary operating software onto the modem board 70.

When the initialization of the modem board is complete, the interface computer 80 enters an idle state. While in the idle state, the interface computer 80, in step 503, turns the Data Carrier Detect (DCD) output signal to the BBS 10 to OFF and then, in step 504, monitors the modem board 70 for a Link Request status message. A Link Request message indicates that a remote HF/MF user is calling in on the station 210.

In step 505, if a Link Request is received from a remote user, the interface computer 80 proceeds to step 506 in which it checks to see whether the Data Terminal Ready (DTR) input signal from the BBS 10 is ON, indicating that the BBS 10 is available to service a call. A DTR signal set to OFF indicates that the interconnection to the BBS 10 is malfunctioning, and therefore the interface computer 80 cannot connect to the BBS 10 and cannot initiate a call. Per step 512, communication on this HF/MF link is therefore terminated.

If DTR is set to ON, the interface computer 80 in step 507 instructs the modem board 70 to establish a link with the caller. The interface computer 80 then, in step 508, sets the DCD output signal to the BBS 10 to ON, signaling the BBS 10 that a call has been initiated. The BBS 10 then responds to the call, and the interface computer 80 acts as a transparent conduit for data communication between the BBS 10 and the HF/MF modem 70.

The interface computer 80 continues to pass data until either the BBS 10 or the remote caller terminates the call in step 509. If the connection is terminated by the remote user in step 510, the interface computer 80 signals the BBS 10 that the session has been terminated by setting the DCD output signal to OFF. If the BBS 10 itself disconnects the call in step 511 by turning DTR to OFF, the interface computer 80 instructs the modem board to terminate the link with the remote user. The interface computer 80 then returns to step 503, sets the DCD output signal to OFF and again enters an idle state, waiting for the next call.

Figure 2:
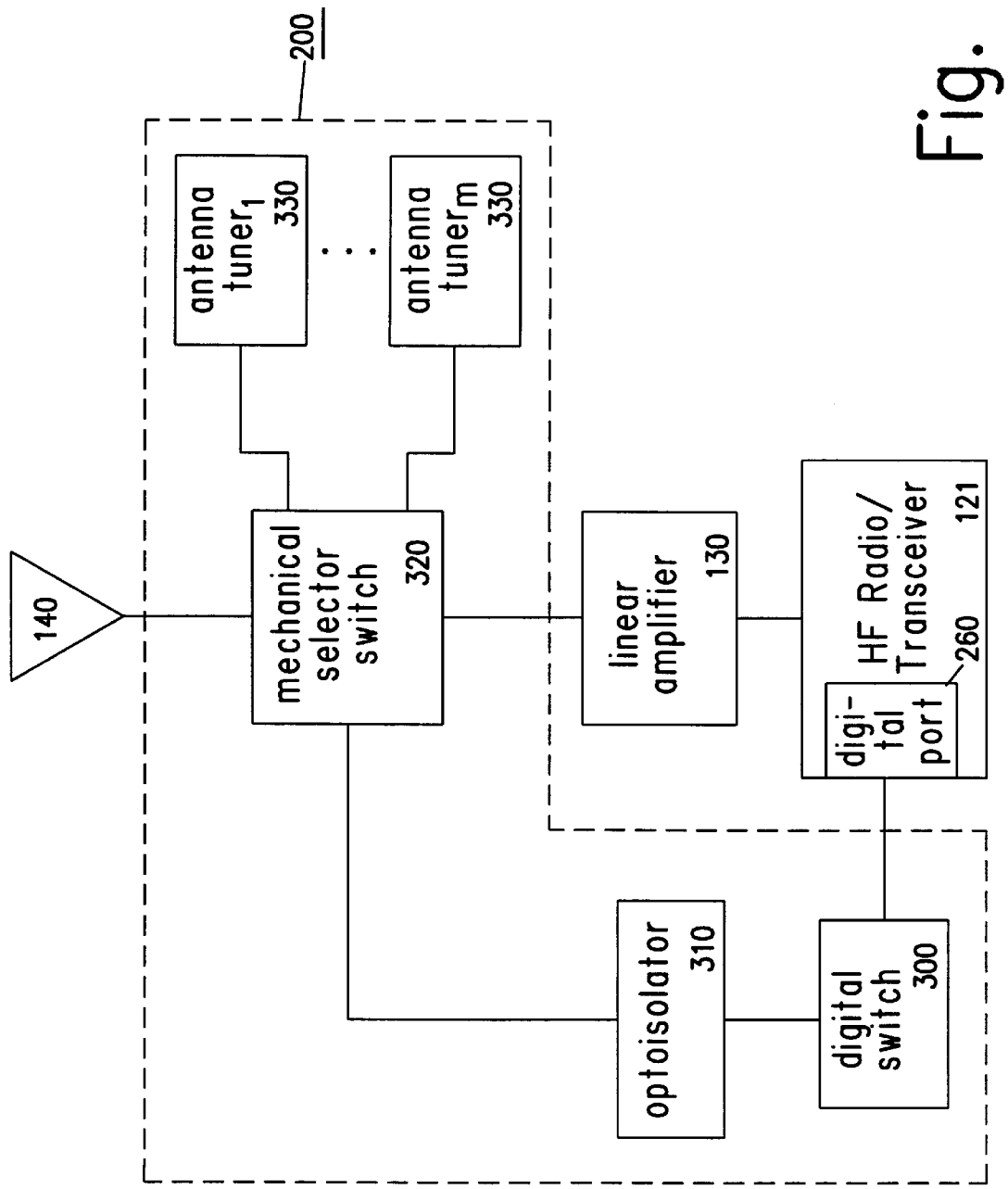
FIG. 2 depicts a high power multi-frequency antenna system according to the present invention.

The communication system according to the present invention is capable of multifrequency operation. FIG. 2 depicts a multifrequency antenna system for use in communication systems, such as the present invention, in which a single antenna is to be used for transmission and reception on multiple, predetermined frequencies. Although there are antennae available which can resonate on multiple, specific frequencies without the need for tuning (e.g., frequencies within a limited band, or harmonic multiples of a frequency), in multifrequency systems in which an antenna is to be operated at frequencies outside its specified frequency set, the ability to tune the antenna for resonation on these additional frequencies is necessary. Antenna tuning ensures that a good frequency match is made between the antenna and the amplified output of the transceiver at each scanned frequency.

Referring to FIG. 2, the HF/MF transceiver 121 having a digital frequency output port 260 emits a digital signal through its digital port 260 indicating to which frequency the transceiver 121 is currently tuned. A digital switch 300 is connected to the digital port 260 of the HF/MF transceiver 121. When the digital switch 300 detects a change in the frequency of the HF/MF transceiver 121, the digital switch 300 triggers the appropriate relays in the mechanical selector switch 320 which connect the linear amplifier 130 and HF/MF transceiver 121 through the appropriate antenna tuner 330 to the antenna 140. In order to protect the digital switch 300 from large static electricity discharges (due to, e.g., lightning strikes), an optoisolator 310 can be inserted into the line between the mechanical selector switch 320 and the digital switch 300.

The mechanical selector switch 320 performs the switching in of the appropriate antenna tuners 330 through, e.g., the use of two sets of relays. In an exemplary embodiment of the present invention, DX Engineering RF relays are employed. In order to switch in a particular antenna tuner 330, one relay is energized to connect the output of the linear amplifier 130 to the appropriate antenna tuner 330, and a second relay is energized to connect the appropriate antenna tuner to the antenna 140.

Antenna tuning systems in which an antenna is automatically tuned to various frequencies by matching the antenna's resonation frequency with the particular frequency of the transceiver are known. However, the known automatic antenna tuning systems have a number of limitations which make them unsuitable for operation in a high speed, multifrequency communication system such as that of the present invention.

For example, most available automatic antenna tuning systems were designed primarily for very low power uses, such as 150 watts or less. These low power tuning systems are thus not capable of operation at the requisite power levels of the central communication facility of the present invention, in which the HF/MF transceivers 120 are often operated at 1 to 1.5 kilowatts. Higher powered automatic antenna tuners capable of handling 1 to 5 kilowatts were known prior to the present invention. However, these tuners are very expensive, typically costing $10,000 or more, and were not designed to handle the constant tuning requirements of a frequency scanning system such as that of the present invention.

Furthermore, there is a considerable time delay when tuning from one frequency to the next with available automatic antenna tuners, which makes such systems undesirable for use in scanning systems, such as that of the present invention. The time delay is due to the way in which the antenna tuning is performed by the automatic tuning systems. For example, when automatic antenna tuners are presented with a desired antenna resonation frequency, most such tuners perform a trial-and-error process, using a motor to tune or throwing various combinations of internal relays connected to electrical coils in an attempt to find the best match for the desired frequency. The resulting time delay can be so excessive that use of an automatic antenna tuner in a scanning system, such as that of the present invention, can lead to a frequently mistuned antenna during scanning, and distortion of the transmission at the outset of each user call.

In addition, motorized automatic antenna tuners were designed for use in situations where retuning is performed relatively infrequently. In a scanning system, such as that of the present invention, where retuning is performed virtually continuously, likelihood of equipment failure is greatly increased due to the high wear and tear on the gears and motor of an automatic antenna tuner.

The high power, multifrequency antenna system of the present invention is capable of operation at much higher power levels than are conventional automatic antenna tuning systems, and is capable of virtually instantaneous switching between desired frequencies without the use of motors. Furthermore, the antenna system according to the present invention employs relatively inexpensive components, and thus provides an economical alternative to the heretofore available high-power automatic antenna tuning systems. In addition, the antenna tuning system of the present invention is not limited to use in HF/MF systems, nor to use in systems operating at a particular power level. By utilizing components rated for the appropriate frequencies and power levels, an antenna tuning system according to the present invention can be constructed for a variety of frequencies and power levels.

The high power capability, as compared with conventional automatic antenna tuners, of the antenna tuning system of the present invention is achieved through the use of digital and mechanical switches and manual antenna tuners which are rated for high power operation. The high power components employed by the antenna system of the present invention are very inexpensive in comparison to high power automatic antenna tuners.

The switching rate of the present antenna tuning system is significantly faster than that of conventional tuning systems. Using conventional automatic antenna tuners, switching between antennas often takes 100 milliseconds or more, whereas switching is accomplished in a few milliseconds in the present invention. The high switching rate of the present invention is enabled in part by the use of a set of pretuned manual antenna tuners, rather than a single automatic tuner.

In an exemplary embodiment, William Nye conventional, medium power antenna tuners are employed. These manual antenna tuners are manually preset to tune an antenna to each of the desired frequencies within the set of frequencies to be scanned for which antenna tuning is necessary, (i.e., there is a manual tuner for each frequency for which an antenna is not suited for operation without first being tuned). Thus, when the transceiver frequency changes, rather than performing an antenna tuning operation, the appropriate pretuned antenna tuner is enabled. The switching in of a pretuned antenna tuner is much faster than the automatic tuning of an antenna.

Figure 3:
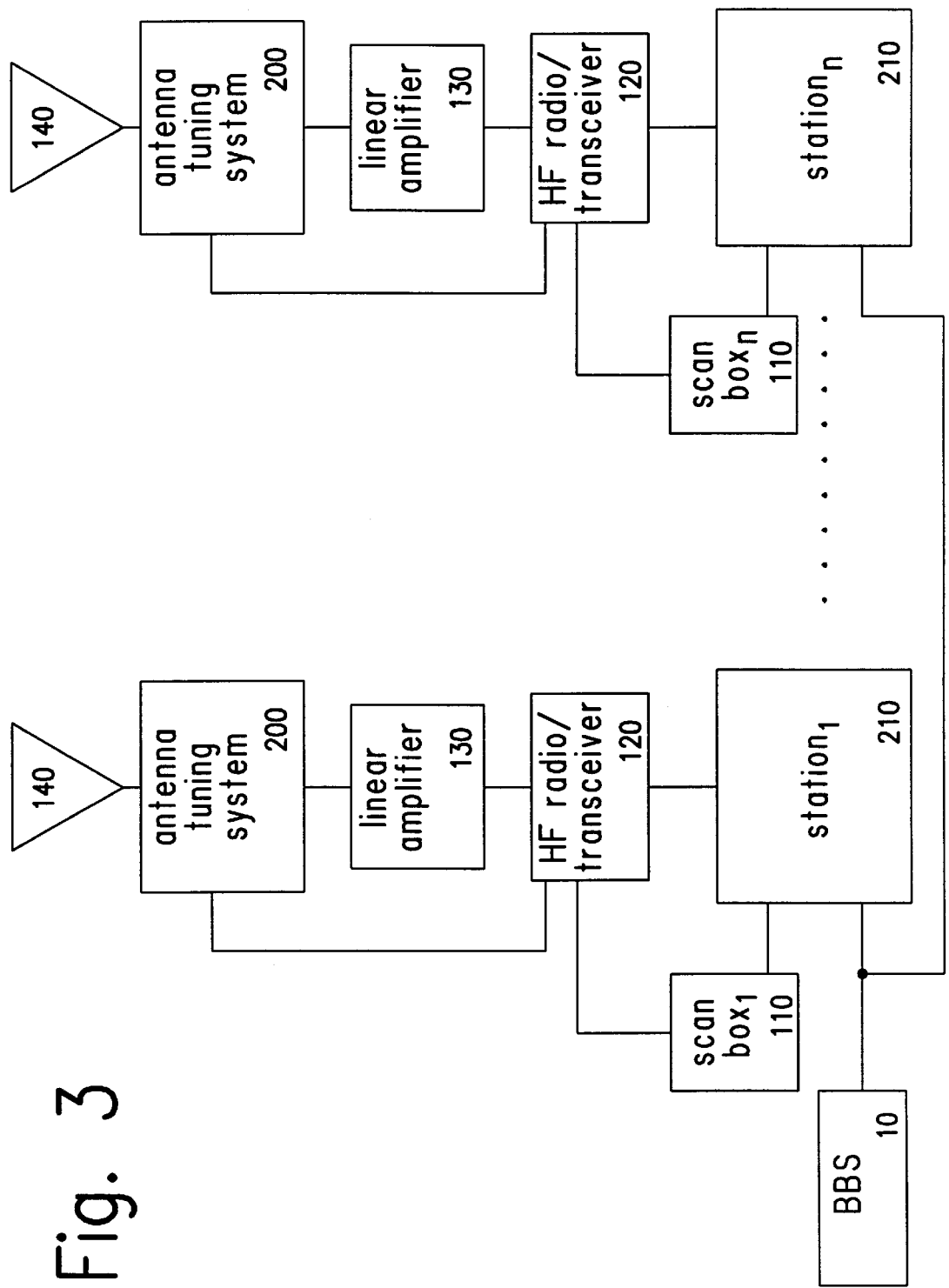
FIG. 3 depicts a multi-frequency, multi-user high speed HF/MF communication system according to the present invention.

FIG. 3 depicts a multi-frequency, multi-user communication system according to the present invention. The configuration of the present invention depicted in FIG. 3 is a combination of the multi-user communication system depicted in FIG. 1 and the high frequency antenna tuning system depicted in FIG. 2. The communication system depicted in FIG. 1 is capable of multi-frequency operation if the antenna 140 employed is configured for use at multiple, specified frequencies without tuning, and if the transceiver 121 does not scan any frequencies other than those specified frequencies. However, as discussed above in relation to FIG. 2, if it is desired to operate on frequencies outside an antenna's specified frequency set, an antenna tuning capability is needed.

Referring to FIG. 3, an antenna tuning system 200 provides each station 210 with the ability to operate on a broader set of predetermined frequencies than would otherwise be possible, as explained above in conjunction with FIG. 2. The scan box 110 connected to each station 210 and associated HF/MF transceiver 121 controls the frequency scanning. For each scanned frequency, the antenna tuning system 200 ensures a frequency match between the amplified output of the transceiver 121 and the antenna 140.

Figure 4:
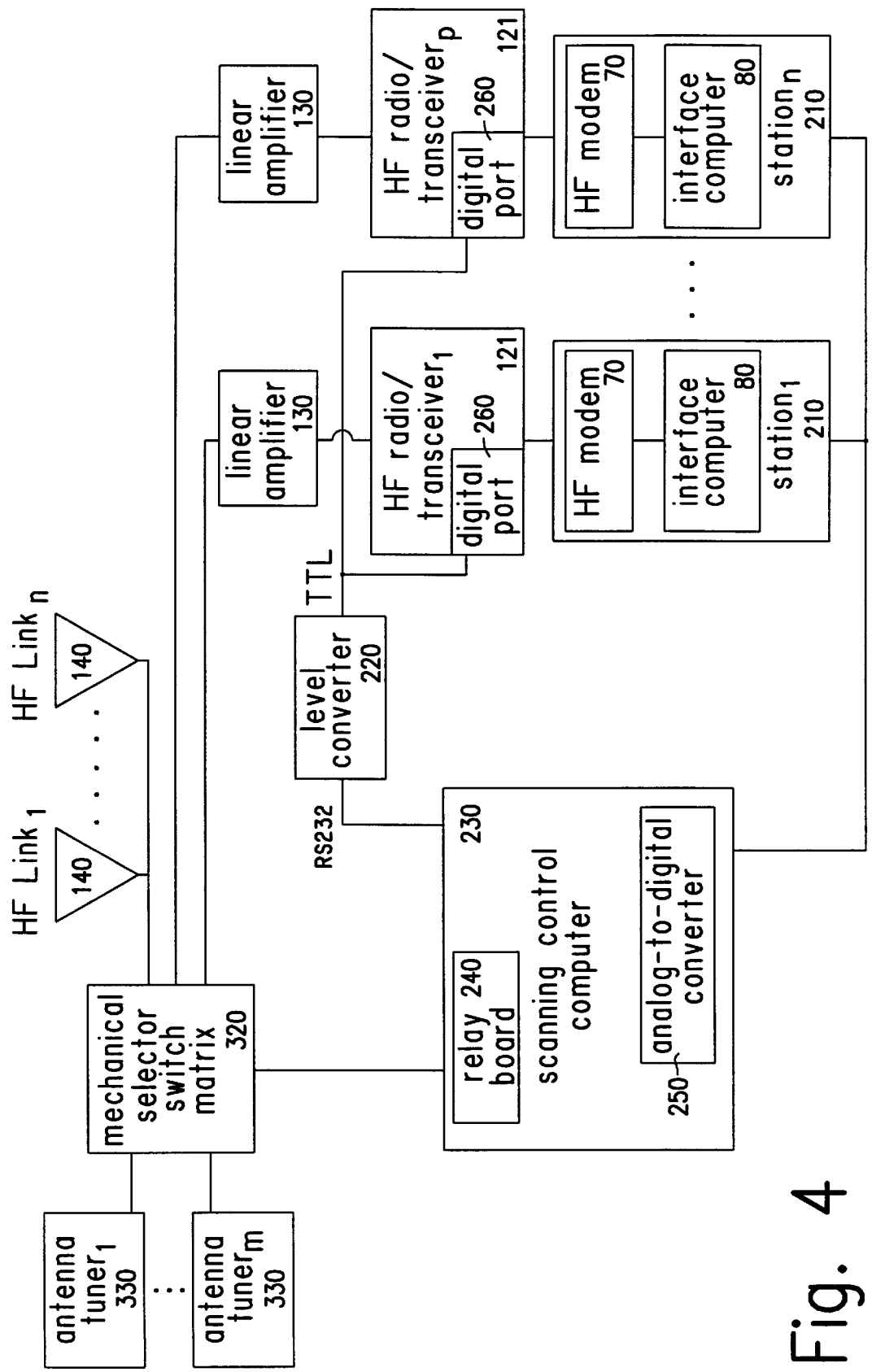
FIG. 4 depicts a multi-frequency, multi-user high frequency HF/MF communication system according to the present invention with a central transceiver scanning control device and a central antenna tuning configuration.

FIG. 4 depicts an exemplary configuration of the present invention in which the frequency scanning of the transceivers 121 for each of the stations 210 of the central communication facility is controlled by a central scanning control computer 230, e.g., a conventional, microprocessor-based computing device. Central, computerized control of the transceiver scanning function in a multi-user, multi-frequency system provides a number of additional advantages over a system employing a separate, mechanical scanning controller for each transceiver.

Centralized scanning control allows for greater system responsiveness to users and greater resource utilization than does distributed scanning control. In a multi-frequency, multi-user system in which transceivers scan a predetermined set of frequencies, the frequencies to be scanned are allocated among each of the stations/transceivers. When a particular transceiver detects an incoming call on one of its assigned frequencies, it stops scanning and services the call. While the call is being serviced, however, the remaining frequencies assigned to that station are no longer scanned, and remote users attempting to call in on those frequencies are unable to make a connection. A central scanning controller, on the other hand, has the advantage of being able to monitor all of the transceivers simultaneously. It can thus determine when one or more of the transceivers has stopped scanning to service a call, and can then temporarily reallocate the frequencies no longer being scanned by the engaged transceiver(s) to the other, unoccupied transceivers, thereby increasing system efficiency and responsiveness.

The use of computerized, rather than mechanical, scanning control also allows for greater exploitation of the available features of certain HF/MF transceivers. For example, many modern HF/MF transceivers contain a set of internal filters which are selectable via the transceiver's digital control port. Selection of the filter mode to be used by the transceiver, as well as the transceiver's transmit and receive frequencies, can be made "on the fly" using computerized control of the digital control port.

For example, many modern HF/MF transceivers include both narrowband and voiceband internal crystal filters. Narrowband filtering of a received signal allows for greater noise reduction than does voiceband filtering, and thus narrowband filtering further increases the code gain realized with high speed, HF/MF modulation techniques. However, many of the recently-developed HF/MF modems have audio frequencies that differ from the center frequency of the built-in narrowband filters of conventional HF/MF transceivers. Thus, in order to take advantage of a transceiver's narrowband filter when using such modems, the transceiver must be purposely "off-tuned" a fixed amount equal to the difference between the modem's center frequency and the center frequency of the narrowband filter. This off-tuning frequency-shifts the received signal to pass through the narrowband filter.

Whether or not there is a difference in the center frequency of a transceiver's narrowband filter and the frequency of an HF/MF modem's audio tones, it may not be desirable to use a narrowband filter while in transmit mode. If the signal from the HF/MF modem to be transmitted does not fall entirely within the bandwidth of the narrowband filter, then some or all of the signal will blocked from transmission if a narrowband filter is employed. In these instances, it is thus necessary to use the transceiver's wider, e.g., voiceband filter, while in transmit mode.

Given the above-mentioned inability to transmit through a narrowband filter with certain types of HF/MF modems, it may be necessary to operate a transceiver in "cross-modes," i.e., with a narrowband filter employed during receive and a voiceband filter employed during transmit, in order to take advantage of the possible increased gain with narrowband receive filtering.

In addition, if frequency-shifting of the received signal is required in order to have the signal pass through the narrowband filter (i.e., if the modem's audio tones are at a different center frequency than is the narrowband filter), then the receive frequency represented to the central facility's transceiver will differ from the "actual" frequency of the signal sent by the remote user. In order for the remote user to receive communication back from the central facility on the same frequency at which the remote user transmitted its signal, it is necessary that the transceiver at the central facility transmit on the "actual" frequency, and not the "off-frequency." Thus, duplex operation, i.e., use of different transmit and receive frequencies (at least as they are presented to the transceiver), is required.

In order to implement duplex and/or cross-mode operation of the central facility's transceivers 121 in a frequency scanning embodiment of the present invention, computerized control of the digital control ports of the transceivers 121 is required so that the appropriate filters and frequencies can be selected "on the fly" as the transceivers 121 scan.

Another advantage of computerized scanning control is that the scanning control computer 230 facilitates the implementation of the multifrequency antenna tuning system of the present invention, which is depicted in FIG. 2 and discussed above. In the configuration of the antenna tuning system depicted in FIG. 2, the digital switch 300 receives the current transceiver frequency information from the digital port 260 of the HF/MF transceiver 121, and then triggers the appropriate relays in the mechanical selector switch 320 so that the appropriate antenna tuner 330 is enabled for that particular transceiver frequency. If a computer is used to implement the transceiver scanning function, the computer itself controls the current frequency of each transceiver, and can thus relay this frequency information directly to the mechanical selector switch for the switching in of the appropriate antenna tuner for each transceiver. The scanning control computer 230 thus performs the function of the digital switch 300, in addition to controlling the scanning of the transceivers.

Computerized scanning control also allows for the implementation of an "intelligent scanning" function. Intelligent scanning involves measuring the signal quality of an incoming call to the central communication facility from multiple antenna directions and servicing the call with an antenna pointing in the direction determined to provide the highest signal quality. Intelligent scanning can be implemented using, e.g., multiple directional antennae pointing in various, dedicated directions, or one or more antennae with adjustable directionality. In addition, intelligent scanning can be implemented using a single scanning receiver and/or transceiver for measurement of the signal quality from various antenna directions, or, alternatively, multiple receivers and/or transceivers. If multiple directional antennae are employed, the use of multiple receivers/transceivers, each dedicated to one directional antenna, allows for a faster and more accurate determination of the "best" antenna direction because the signal quality on each antenna can be tested simultaneously rather than serially, as would be required if a single transceiver had to be switched among the various antennae.

In performing intelligent scanning, one or more scanning receivers and/or transceivers quickly scan the assigned frequencies. When an incoming call is detected by one of these scanning devices, the "best" antenna direction for handling the call is determined by quickly measuring the signal quality for the call from various antenna directions. When the best direction is determined, the computerized scan controller assigns the best available antenna to an idle transceiver for servicing of the remote user's call.

Referring to FIG. 4, the scanning control computer 230 controls the scanning function of each transceiver 121 by sending serial commands to the digital port 260 of each HF/MF transceiver 121 each time a new frequency is to be scanned. The commands indicate the receive frequencies and filters to be used, as well as the transmit frequencies and filters if they are different. Because the output signal from the scanning control computer 230 is an RS232 signal, a level converter 220 can be inserted into the line between the computer 230 and the digital ports 260 of the transceivers 121 if transceivers 121 which expect TTL input signals, such as the ICOM 765 transceiver, are employed.

When the HF/MF modem 70 associated with one of the transceivers 121 detects an incoming call on one of its assigned frequencies, a signal, e.g. an analog signal, is output from the PTT or scan control line of the HF/MF modem 70 to the scanning control computer 230, triggering the scanning control computer 230 to stop sending new scanning frequency signals to the transceiver 121 while the call is being serviced. An analog-to-digital converter 250 in the scanning control computer 230 is used to detect changes in electrical state of the PTT or scan control line of the HF/MF modem 70. When the station 210 finishes servicing the call, the analog output signal (either PTT or scan control)

of the HF/MF modem 70 changes state, triggering the scanning control computer 230 to resume scanning. A relay board 240 in the scanning control computer 230 triggers the appropriate relays in the mechanical selector switch matrix 320 to switch in the appropriate antenna tuner 330, based upon a particular transceiver's frequency setting, as indicated by its digital frequency output signal, thereby connecting the antenna tuner 330 to both the transceiver 121 and its corresponding antenna 140.

The embodiment of the present invention depicted in FIG. 4 employs a single set of antenna tuners which is shared by all transceiver/antenna pairs via a mechanical switch matrix. The present invention could alternatively be implemented, for example, as depicted in FIG. 4a, using a dedicated set of antenna tuners and mechanical selector switch for each transceiver/antenna pair.

Figure 4A:
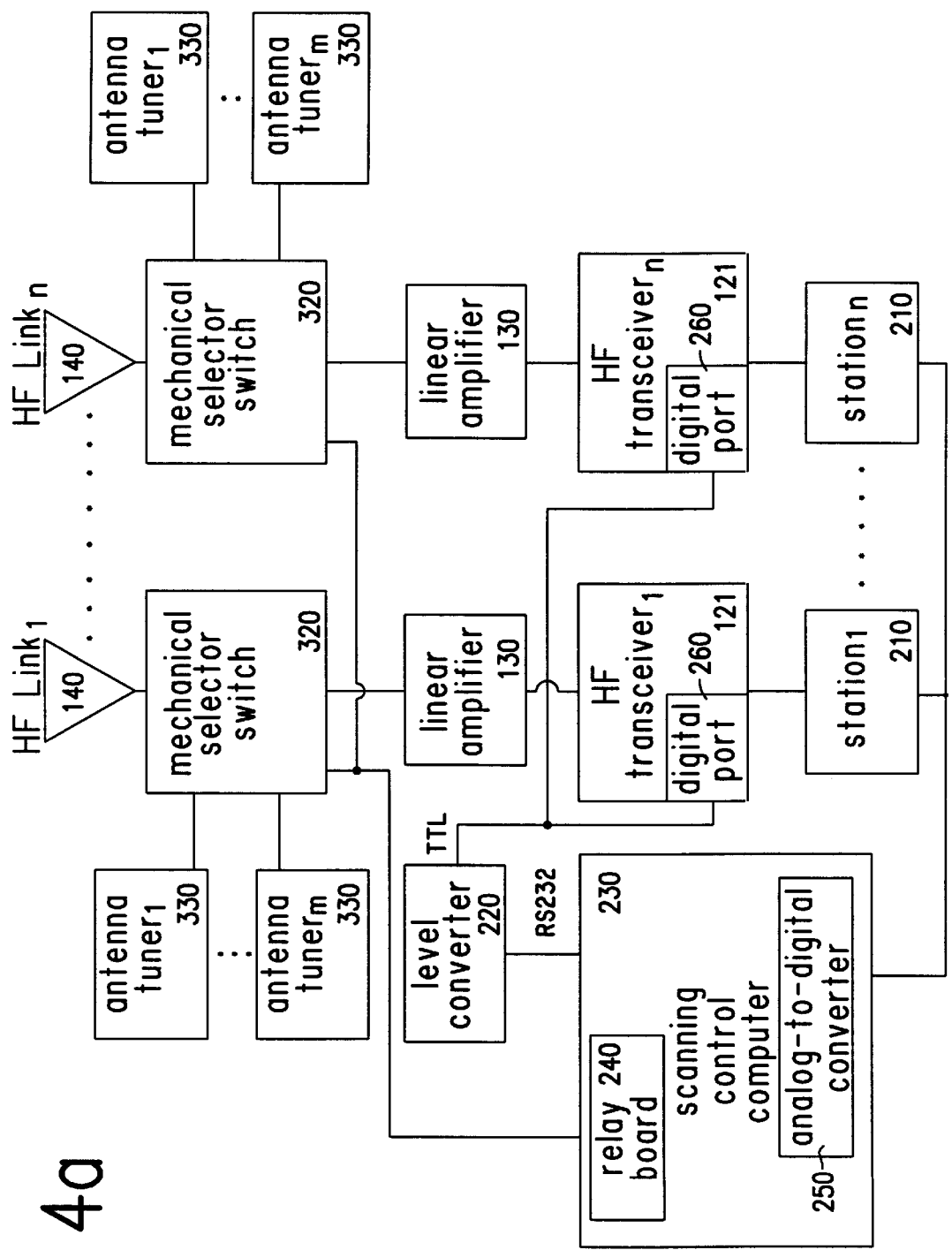
FIG. 4a depicts a multi-frequency, multi-user high frequency HF/MF communication system according to the present invention with a central transceiver scanning control device and dedicated antenna tuning systems for each HF/MF link.
Figure 5:
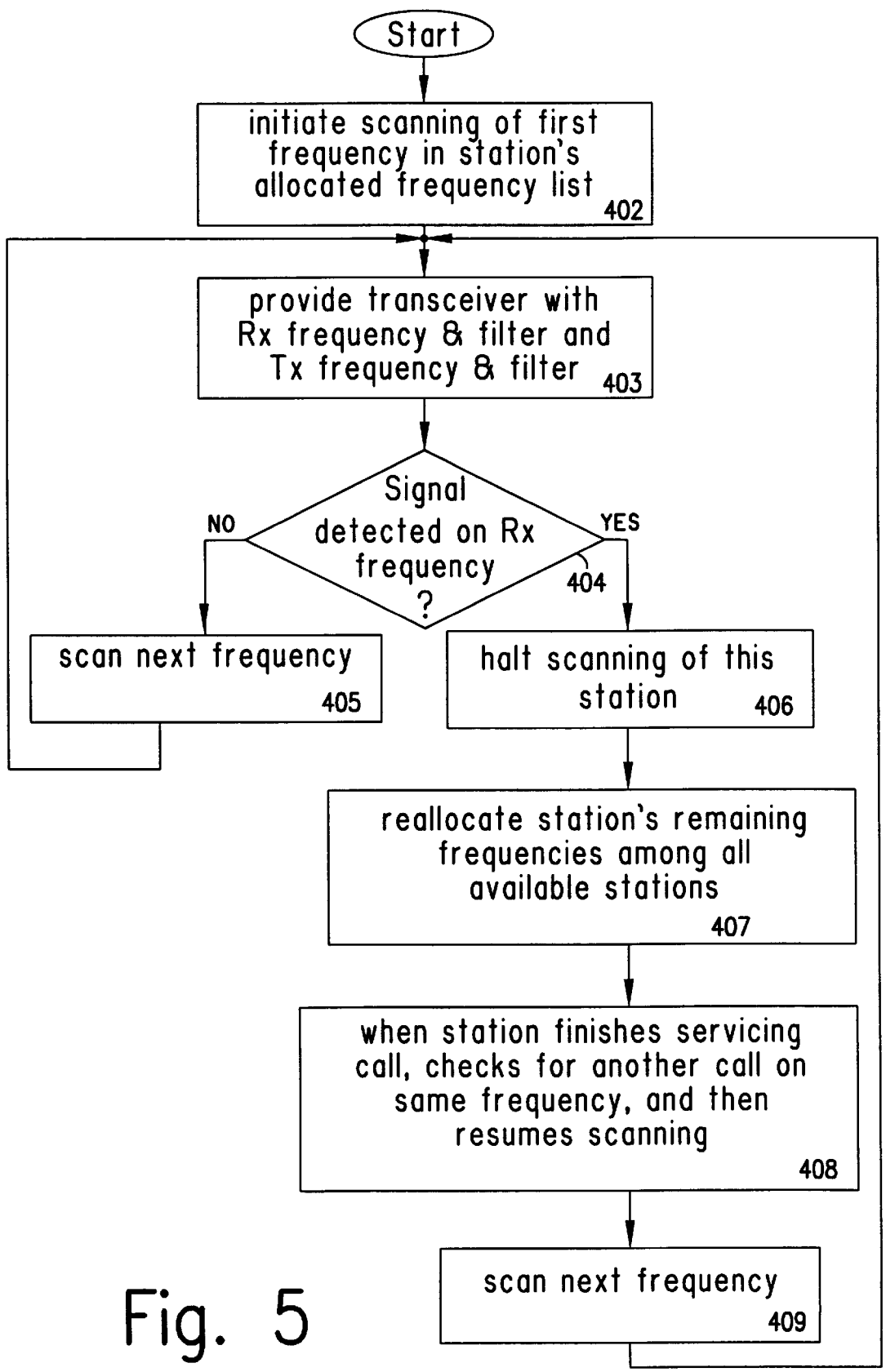
FIG. 5 depicts the functionality implemented by a central transceiver scanning control device according to the present invention.

FIG. 5 depicts the functionality of the computerized scanning control depicted in FIGS. 4 and 4a. The methodology shown in FIG. 5 represents the steps to be implemented by the scanning control computer 230 with respect to each transceiver 121 and its associated station 210. It will be appreciated that the scanning control methodology depicted in FIG. 5 can be employed in a broad range of communication systems; its use is not limited to HF/MF communication systems.

The scanning control computer 230 begins in step 402 by directing the transceiver 121 to scan the first frequency in that station's 210 allocated frequency list. The scanning control computer 230, in step 403, provides the transceiver 121 with the appropriate receive frequency and filter, and corresponding transmit frequency and filter (if different filters and/or frequencies are to be used on transmit and receive). If no signal is detected on the current transceiver scan frequency in step 404, the scanning control computer 230 in step 405 instructs the transceiver 121 to scan the next frequency in that station's 210 frequency list.

If a signal is detected by the transceiver 121 on the current receive frequency in step 404, the transceiver station 210 in step 406 directs the scanning control computer 230 to halt the scanning while the station 210 services the call. The scanning control computer 230 then in step 407 temporarily reallocates the station's remaining frequencies among any stations not currently servicing calls. Of course, if all stations are simultaneously servicing calls, available frequencies cannot be reallocated and scanning ceases until one or more of the stations 210 becomes available to resume scanning.

When the station 210 finishes servicing a call in step 408, it checks to see whether another call is coming in on the same frequency. If so, the station 210 services the call. If there is no other call coming in on the station's current frequency at that time, the station 210 signals the scanning control computer 230 that it is available to resume scanning. The scanning control computer 230 then reallocates the frequencies once again among the available stations 210, and instructs the transceiver 121 in step 409 to scan the next frequency in the station's 210 current list of allocated frequencies.

Figure 7:
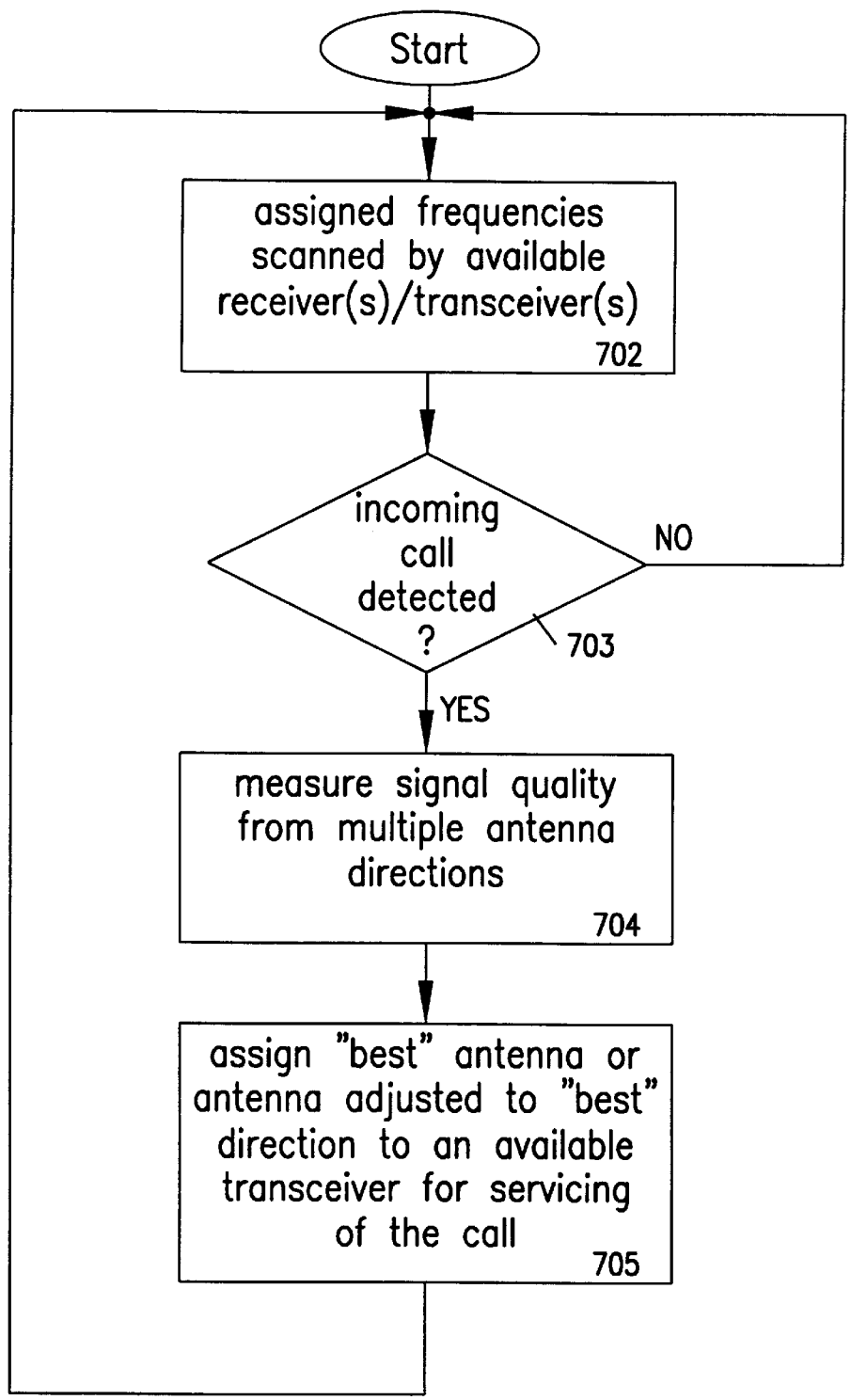
FIG. 7 depicts an intelligent scanning methodology implemented by a central transceiver scanning control device according to the present invention.

The flowchart in FIG. 7 depicts the methodology of the intelligent scanning function according to the present invention discussed above in conjunction with the computerized scanning control depicted in FIGS. 4 and 4a. It will be appreciated that the intelligent scanning methodology depicted in FIG. 7 can be employed in a wide variety of communication systems; its use is not limited to HF/MF communication systems.

The scanning control computer 230 begins in step 702 by directing the scanning of the assigned frequencies by one or more transceivers 121. If an incoming call is detected by a transceiver in step 703, the "best" directional antenna 140 to assign to the call is determined in step 704 by measuring the signal quality on each of the available directional antennae 140, if multiple antennae are employed. If one or more antennae with adjustable directionality are used, the signal quality for various antenna directions are measured in step 704. The scanning control computer 230 then, in step 705, assigns the "best" antenna 140 (or an antenna 140 configured to point in the "best" direction if one or more adjustable antenna are used) to an idle transceiver 121 for servicing of the call.

Figure 8:
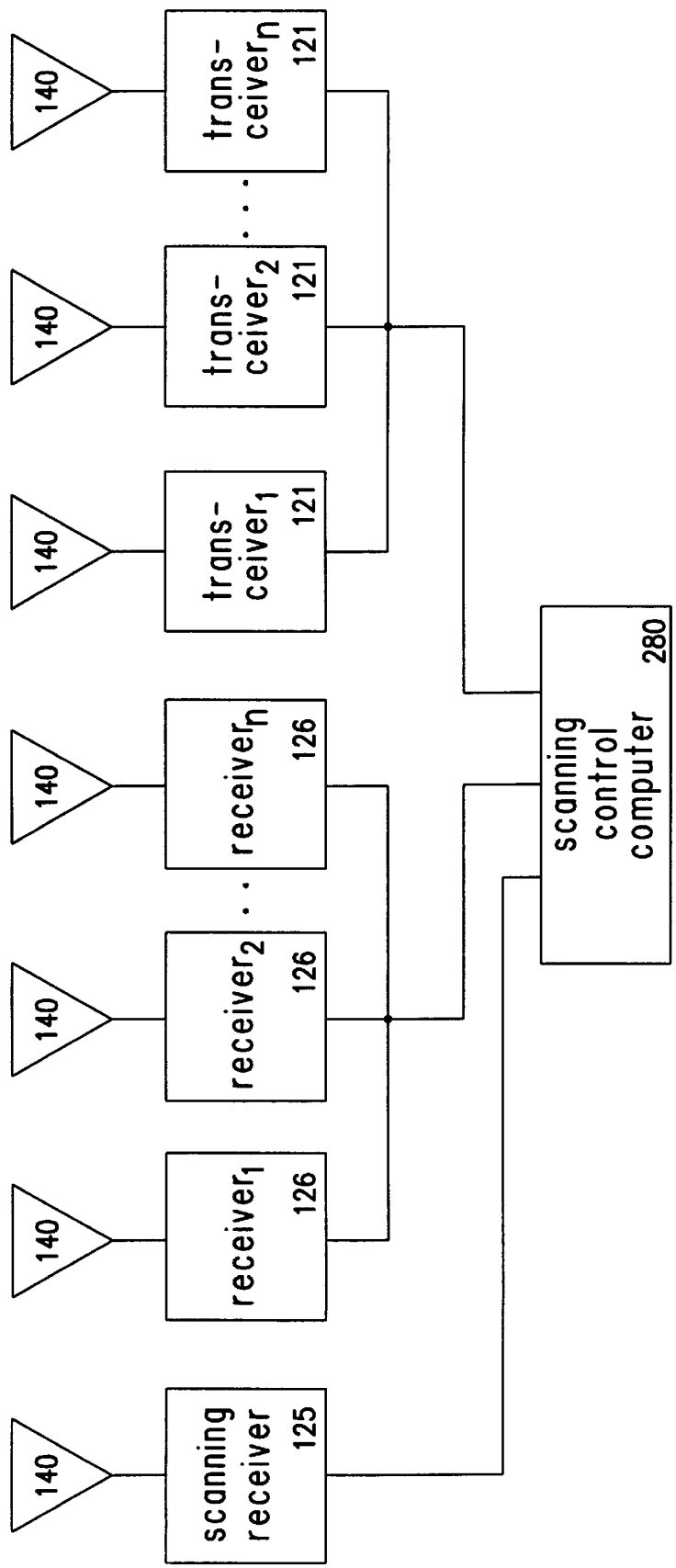
FIG. 8 depicts an exemplary embodiment of the present invention for performing intelligent scanning using three sets of radios and antennae in conjunction with a central transceiver scanning control device.

FIG. 8 depicts a preferred embodiment of the intelligent scanning function according to the present invention in which three sets of antennae and radios are employed: one set for performing scanning; one set for determining the "best" antenna direction; and one set for servicing calls. Referring to FIG. 8, a scanning receiver 125 connected to an omnidirectional antenna 140 is instructed by the scanning control computer 230 to scan the assigned frequencies for incoming signals. If a signal is detected by the scanning receiver 125, the scanning control computer 230 instructs a set of receivers 126, each connected to a directional or omnidirectional antenna 140, to check the signal strength of the incoming call. The scanning control computer 230 then assigns the transceiver 121 connected to the directional antenna 140 pointing in the direction determined by the scanning control computer to be the "best" antenna direction to service the incoming call. If the desired transceiver 121 is unavailable because, e.g., it is busy servicing a call, the scanning control computer 230 assigns the call to, e.g., the transceiver 121 associated with the "second best" antenna, or to a transceiver 121 connected to an omnidirectional antenna 140.

It may be desirable to include an antenna tuning capability, such as that discussed above in conjunction with FIGS. 2, 3, 4, and 4a, with one or more of the antennae 140 in the embodiment of the present invention depicted in FIG. 8. In addition, the embodiment of the present invention depicted in FIG. 8 can be modified so that each transceiver 121 can be used with one or more antennae 140, through a switching mechanism such as that depicted in FIG. 4. Thus, there need to be a one-to-one correspondence between the number of transceivers 121 and associated antennae 140. Rather, a bank of antennae 140 and a bank of transceivers 121 can be employed, along with a switching capability for connecting a given transceiver 121 to a given antenna 140.

What is claimed is:

1. A high speed, digital communication system, comprising:
   a land-line bulletin board system; and
   a communication link coupled to the bulletin board system, the land-line bulletin board system and the communication link forming a central communication facility, the communication link having
   (a) a modem employing one of an HF high speed modulation technique and an MF high speed modulation technique,
   (b) an interface device coupled between the bulletin board system and the modem,
   (c) a transceiver coupled to the modem,
   (d) an antenna coupled to the transceiver, and
   (e) a scanning controller coupled to the transceiver and to the modem.

2. The communication system of claim 1, wherein the communication link includes a plurality of communication links.

3. The communication system of claim 1, wherein the central communication facility is coupled to a remote user.

4. The communication system of claim 1, wherein the land-line bulletin board system includes a plurality of land-line bulletin board systems.

5. The communication system of claim 1, wherein the central communication facility further includes
   a weather satellite link retrieving weather data from a weather satellite service, and
   a weather computer coupled to the weather satellite link and to the land-line bulletin board system, the weather computer processing the weather data.

6. The communication system of claim 5, wherein the central communication facility further includes
   a file server coupled between the weather computer and the land-line bulletin board system.

7. A high speed, digital communication system, comprising:
   a land-line bulletin board system; and
   a communication link coupled to the bulletin board system, the land-line bulletin board system and the communication link forming a central communication facility, the communication link having
   (a) a modem employing one of an HF high speed modulation technique and an MF high speed modulation technique,
   (b) an interface device coupled between the bulletin board system and the modem,
   (c) a transceiver coupled to the modem,
   (d) an antenna coupled to the transceiver, and
   (e) a linear amplifier coupled between the transceiver and the antenna.

8. A high speed, digital communication system, comprising:
   a land-line bulletin board system; and
   a communication link coupled to the bulletin board system, the land-line bulletin board system and the communication link forming a central communication facility, the communication link having
   (a) a modem employing one of an HF high speed modulation technique and an MF high speed modulation technique,
   (b) an interface device coupled between the bulletin board system and the modem,
   (c) a transceiver coupled to the modem,
   (d) an antenna coupled to the transceiver,
   (e) a multifrequency antenna tuning system for tuning the antenna to a tuning frequency in a specified frequency set, the tuning system including:
     (1) a selector switch coupled to the transceiver and to the antenna, the selector switch including at least one first relay and at least one second relay,
     (2) at least one pretuned manual antenna tuner coupled to the selector switch, and
     (3) a digital switch coupled to the transceiver and to the selector switch, the digital switch detecting a change in the tuning frequency of the transceiver and triggering a predetermined one of the at least one first relay in the selector switch to connect the antenna to the pretuned manual antenna tuner corresponding to the tuning frequency of the transceiver and triggering a predetermined one of the at least one second relay in the selector switch to connect the pretuned manual antenna tuner to the transceiver, and
   (f) a scan box coupled to the modem and to the transceiver, the scan box providing electromechanical scanning of the transceiver within the specified frequency set.

9. The communication system of claim 8, wherein the communication link further includes;
   (g) a linear amplifier coupled between the transceiver and the selector switch.

10. The communication system of claim 8 wherein the communication link further includes a plurality of communication links.

11. The communication system of claim 10, wherein each communication link of the plurality of communication links further includes:
   (h) a linear amplifier coupled between the transceiver and the selector switch.

12. A high speed, digital communication system, comprising:
   a land-line bulletin board system; and
   a communication link coupled to the bulletin board system, the land-line bulletin board system and the communication link forming a central communication facility, the communication link having
   (a) a modem employing one of an HF high speed modulation technique and an MF high speed modulation technique,
   (b) an interface device coupled between the bulletin board system and the modem,
   (c) a transceiver coupled to the modem,
   (d) an antenna coupled to the transceiver,
   (e) a microprocessor-based scanning controller coupled to the transceiver,
   (f) a plurality of pretuned manual antenna tuners, and
   (g) a switching device coupled to the transceiver, to the antenna, and to the microprocessor-based scanning controller for connecting a predetermined one of the plurality of pretuned manual antenna tuners to the transceiver and to the antenna.

13. The communication system of claim 12 wherein the antenna includes a plurality of antennae.

14. The communication system of claim 13 wherein the microprocessor-based scanning controller compares a signal quality of an incoming signal via at least two of the plurality of antennae and selects the antenna providing a predetermined signal quality as an optimal antenna for processing the incoming signal.

15. The communication system of claim 14 wherein the communication link further includes a plurality of receivers and wherein the transceiver includes a plurality of transceivers.

16. The communication system of claim 15 wherein the microprocessor-based scanning controller
   directs one of the plurality of receivers to scan for incoming calls,
   upon detection by the receiver of an incoming call, directs each of at least two of the plurality of receivers to measure the signal quality of the incoming call via one of the plurality of antennae,
   selects the antenna providing the predetermined signal quality as the optimal antenna, and
   assigns the optimal antenna to one of the plurality of transceivers for processing of the incoming call.

17. The communication system of claim 12, wherein the communication like further includes:
   (h) a linear amplifier coupled between the transceiver and the switching device.

18. The communication system of claim 12, wherein the communication link includes a plurality of communication links.

19. A multifrequency antenna tuning system for tuning an antenna coupled to a transceiver to a tuning frequency in a specified frequency set, the tuning system comprising:

(a) a selector switch coupled to the transceiver and to the antenna, the selector switch including at least one first relay and at least one second relay;

(b) at least one pretuned manual antenna tuner coupled to the selector switch; and (c) a digital switch, coupled to the transceiver and to the selector switch, the digital switch detecting a change in the tuning frequency of the transceiver and triggering a predetermined one of the at least one first relay in the selector switch to connect the antenna to the pretuned manual antenna tuner corresponding to the tuning frequency of the transceiver and triggering a predetermined one of the at least one second relay in the selector switch to connect the pretuned manual antenna tuner to the transceiver.

20. The multifrequency antenna system of claim 19, further comprising (d) a linear amplifier coupled between the transceiver and the selector switch.

21. The multifrequency antenna system of claim 19, further comprising:

(d) an optoisolator coupled between the digital switch and the selector switch.

22. A method for scanning control of a multi-frequency, multi-transceiver communication system, each transceiver of the multi-transceivers being initially assigned a first set of frequencies to be scanned, the method comprising the steps of:

(a) for each transceiver of the multi-transceivers, scanning for incoming signals on each frequency of the first set of frequencies;

(b) after detecting an incoming signal by one transceiver of the multi-transceivers on a frequency in the first set of frequencies (i) halting scanning of the transceiver, and (ii) reallocating the remaining frequencies in the first set of frequencies among at least one other transceiver of the multi-transceivers for a duration of the incoming signal; and (c) after the duration of the incoming signal, assigning to the transceiver a second set of frequencies to be scanned.

23. A method for assigning an optimal antenna to an incoming signal in a communication system, the communication system having at least one transceiver, each of the at least one transceivers being coupled to at least one of a plurality of antennae, the method comprising the steps of:

(a) detecting an incoming signal via one of the at least one transceiver;

(b) after detecting the incoming signal, measuring a signal quality of the incoming signal on at least two of the plurality of antennae; and (c) with a digital switch, selecting one of the plurality of antennae having a predetermined signal quality as the optimal antenna for processing the incoming signal.

24. The method according to claim 23, wherein the one of the plurality of antennae is selected with the digital switch and a microprocessor-based scanning controller.

25. The method according to claim 23, wherein the one of the plurality of antennae is selected with the digital switch and a selector switch.

\* \* \* \* \*